Jan. 3, 1961  W. A. LINTERN ET AL  2,966,779
HEATING AND COOLING SYSTEM FOR MOTOR YACHTS
Filed May 27, 1957  2 Sheets-Sheet 1

INVENTORS.
WILLIAM A. LINTERN &
JAMES W. LINTERN,
BY
ATTORNEY.

INVENTORS.
WILLIAM A. LINTERN +
JAMES W. LINTERN,
BY
their ATTORNEY.

United States Patent Office 2,966,779
Patented Jan. 3, 1961

---

2,966,779

HEATING AND COOLING SYSTEM FOR MOTOR YACHTS

William A. Lintern, Painesville, and James W. Lintern, Unionville, Ohio, assignors to Larco, Inc., Painesville, Ohio, a corporation of Ohio Filed May 27, 1957, Ser. No. 661,838

7 Claims. (Cl. 62—160)

This invention relates to a heating and cooling system for motor yachts, particularly for motor yachts of thirty or more feet in length in which individual compartments are provided for passenger quarters, galleys, engines, and the like.

In yachts of this character, useful space is extremely limited, particularly in the passenger occupied portions. Accordingly, any heating and cooling system therefor should be one requiring a relatively small amount of room, both for the source of heat and cold and for the distribution system employed. Important also is the ability of the system to withstand the vibrations and twisting imposed by yachts when the yachts are operating in rough weather. The system should operate quietly. It should be easy to install and to service.

In accordance with established prior practices in heating boats of this character, one system is to employ small fuel burning heaters in or near the space where heating is desired. These heaters are undesirable in many respects.

Another system is to employ a small central heater located in the engine room or compartment, or in some space which is least desirable for passenger use, dependence being placed on convection currents to distribute the heated air about the yacht.

A third system is to use a small central heater and distribute heated air therefrom by means of ducts and fans. These have proven undesirable from the standpoint of space required for the ducts and the difficulty of installing them.

A fourth prior system that is employed is the use of a sealed system of hot water or steam lines or pipes extending throughout the boat and connected with a central water or steam heater.

Heating by local electric heaters imposes severe loads on the batteries and generators and also such heaters may ignite articles near to them.

These various systems heretofore used are satisfactory at best only for the purpose of heating. Additional equipment must be supplied for cooling.

For cooling, one system employs a central refrigerator with the expectation that the cooler air will somehow find its way into different parts of the boat by natural convection currents. Subsequent attempts have been made to use ducts and fans for cooling.

If a central system is not used, then separate complete cooling units must be placed in the various compartments. These occupy considerable space and when so located can serve only a cooling, not heating, function.

In all forced air duct systems, there is the excessive battery load for operating the fans, pumps, or blowers.

A later development is to use a simple reversible heating and cooling system employing a compressor and a sealed fluid refrigerant system in which the system can be operated to pick up the heat in certain compartments for cooling them and can be reversed and forced to give up heat in the compartments for heating thereof. Such systems use either a water-cooled condenser or an air-cooled condenser. An air-cooled condenser adequate for use in such a system as a heater only would be inadequate for cooling. A much larger air-cooled condenser is necessary for cooling.

On the other hand, a water-cooled condenser adequate for cooling only would be inadequate for heating. A much larger water-cooled condenser is necessary for heating.

If a very large air-cooled condenser is used, a very high volume fan and large ports in the hull for the ingress and egress of air are required in order to keep the head pressures in line and the horsepower normal during the cooling cycle.

The heating and cooling system of the present invention comprises a sealed, reversible cycle system which is used both for heating and cooling. It employs, as heat exchangers, both an air-cooled condenser and a water-cooled condenser. During the cooling cycle, it utilizes the water-cooled condenser or exchanger so as to obtain a maximum of cooling with a minimum space requirement and equipment and, on the other hand, during the heating cycle, it supplements the water-cooled condenser with an auxiliary circuit which includes an air-cooled condenser or exchanger for the picking up of heat from the air.

Thus, the present invention constitutes a reversible heating and cooling system including a combination of air-to-gas plus water-to-gas heat exchange for heating with a gas-to-water heat exchange for cooling, as a result of which the air-to-gas condenser or exchanger and remainder of the heating and cooling source can be relatively small in relation to its output. By combining the two types of heat exchanger in a single system, the very large air-cooled condenser which would otherwise be required can be eliminated, and high volume fans and large ventilating openings in the hull for introducing sufficient cooling air to maintain low line pressures and horsepower requirements are unnecessary. At the same time, adequate heat can be obtained with a relatively small water-to-gas exchanger.

By the dual air-to-gas and water-to-gas system, advantage can be taken of the greatest temperature differential available so that horsepower requirements for a given output of heat or cold can be greatly reduced.

The combination makes possible the heating of the passenger quarters by the pickup of heat from three sources, fuel consuming apparatus on the boat, such as the engine, the water in which the boat is floating, and the heat of compression.

By the present combination, heat can be removed from the engine room and galley or separate isolated heater compartment and supplied, free of fumes and odors, exactly where desired, such as in the forward cabin, deckhouse, dinette, and other occupied quarters, thus tempering the engine room and the galley while heating the other quarters.

By reversing the same system, any compartment can be cooled, selectively or concurrently.

The invention contemplates the automatically controlled dual purpose heating and cooling radiators in the passenger quarters which may be controlled independently of each other, wherever they are distributed throughout the boat.

A correlative feature of the invention is the use of high pressure hydraulic hoses as the main conduits leading from the central heating and cooling unit to the various dual purpose heating and cooling radiators in the compartments to be heated and cooled, thus eliminating the necessity of relatively large insulated air ducts and their many disadvantages or of metallic main pipelines and their fittings and connections.

Such hoses are highly insulating thermally so that they prevent any appreciable thermal losses between the heating or cooling source and the radiators. Further, they do not sweat and therefore cannot cause an accumulation of condensate in undesired places throughout the boat. They operate quietly. They can be installed readily merely by dropping them into the bilge and connecting their ends to the central unit and to radiators in the compartments. Furthermore, the hoses are not affected adversely by bilge liquids, such as salt water, chemicals, oil, and the like, customarily present in the bilges of boats. There is no danger of cracking and leaking with resultant loss of water or refrigerant, or of overheating of boilers or the discharge of dangerous unconfined refrigerating fluids and gases. They are quiet under changes in temperature. They are not strained by twisting and vibration of the boat and hence operate quietly and without developing leaks.

In accordance with the present invention, the horsepower requirements for fans are quite limited as the fans are located adjacent the radiators in the compartments and need circulate the air only locally. The heating and cooling radiators can act as dehumidifiers.

By use of the combination of a water-cooled condenser and an air-cooled condenser, there is ample heating and cooling for the various compartments in a small compact central unit.

By virtue of the present invention, heat can be removed from the engine room or galley and transferred without fumes to any part of the boat desired with no appreciable loss along the way. This contributes also to a saving in space and size of the central unit and distribution system.

In operation, generally, the heating is effected by the picking up by the gaseous refrigeration medium of heat in the engine room through the air-cooled condenser and from the outside water through the water-cooled condenser, both of which condensers, during the heating cycle, operate as evaporators and from the compressor itself. The heated and expanded refrigeration medium in gaseous form then passes to a compressor and is pumped under pressure to radiators in various compartments where required. The radiators radiate the heat and the refrigeration medium condenses and passes to a receiver. From the receiver, it is expanded through the air-to-gas condenser and through the water-cooled condenser, both of which are temporarily acting as evaporators, and from these it passes back to the inlet of the compressor. To obtain enough heat without too great a size, it is necessary to have both the water-to-gas heat exchanger or condenser and the air-to-gas heat exchanger or condenser.

If extra heat is desired when the boat is standing, it is usually only necessary to start and idle the engine for a few minutes to provide enough heat in the engine compartment for heating the passenger quarters, and this heat can then readily be picked up by the system without opening the engine compartment to the living quarters.

In cooling, the liquid refrigerant is pumped through the water-cooled condenser to a receiver and from there passes to expansion valves of the radiators in the various compartments, is expanded in the radiators and, in gaseous form, passes to the inlet of the compressor, whereby it is again pumped under pressure through the water-cooled condenser. Generally, during cooling, the media by-passes the air-cooled condenser because it would add heat to the already cooled media issuing from the water-cooled condenser.

In general, each of the radiators is provided with a drip pan and discharge conduit or hose by which the condensate which accumulates during cooling and dehumidification of the compartments is drained directly into the bilge, and thus is pumped out and disposed of along with the other bilge liquids by the bilge pump.

Various objects and advantages of the invention will become apparent from the following description wherein reference is made to the drawings in which.

Figure 2:
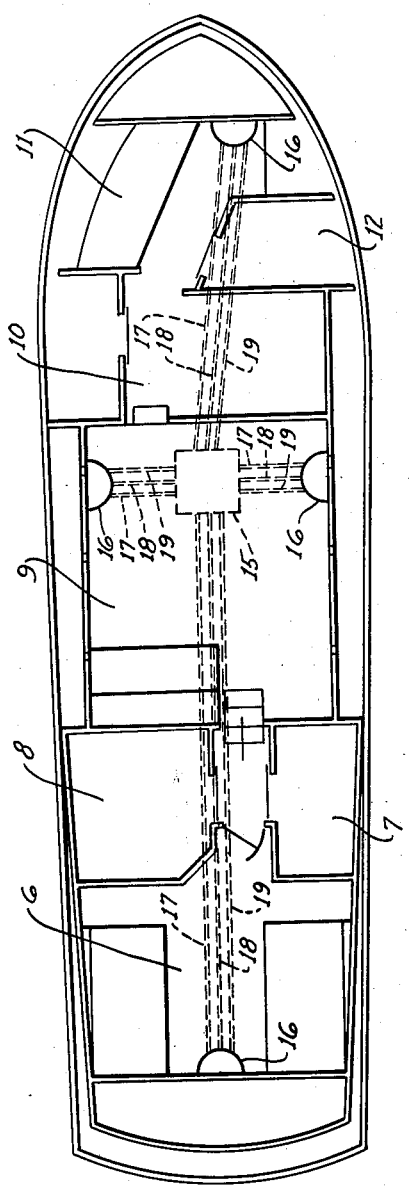
Figs. 1 and 2 are a top plan view and side elevation, respectively, of a motor driven pleasure yacht with the present invention installed, part of the yacht being shown in section for clearness in illustration.

Referring to the drawings, the yacht has a hull 1 in which there is a decking or flooring 2 beneath which is the bilge 3. An engine room or compartment 4 is provided amidships and generally may be isolated from the remainder of the interior of the hull and compartments but is provided with ventilator ports 5. The engine compartment generally is closed by a suitable hatch which may be opened for access to the engine.

The manner of dividing up the occupied space in the yacht is determined largely by the desires of the particular owner and, in the form illustrated, there are shown a rear sleeping compartment 6, a bath and toilet compartment 7, a guest sleeping compartment 8, a lounge room 9, in which is located the dining table, a galley 10, a forward sleeping compartment 11, and toilet compartment 12. It will be noted that some of these compartments are separated from each other and can be completely isolated by closing suitable sliding doors, all in a well-known manner.

In accordance with the present invention, the central unit, indicated at 15, is located in the engine compartment and suitable hydraulic hose lines lead therefrom to room radiators 16 which are distributed at the points required about the boat. As will be more fully explained hereinafter, preferably three lines lead to each one of the radiators 16 from the unit 15, these lines, in each instance, being designated at 17, 18, and 19.

Figure 3:
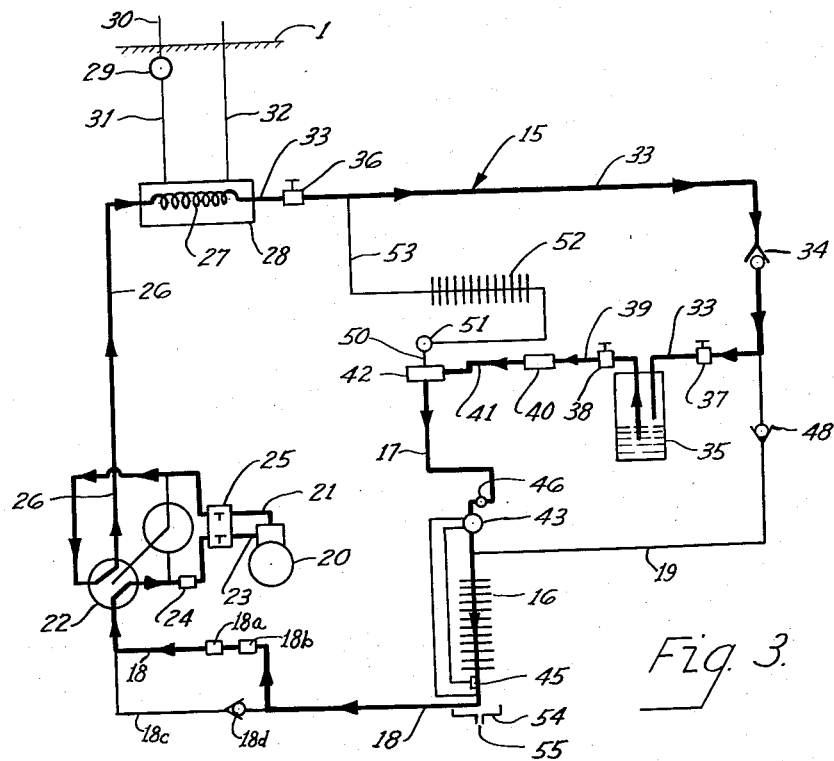
Fig. 3 is a diagram of the heating and cooling system of the present invention, illustrating its operation during a cooling cycle.

The unit 15 is best illustrated in Fig. 3 and comprises a compressor 20 which is driven by a suitable motor, not shown, in a conventional manner. Pipe line 21 connects the outlet of the compressor to a four-way reversing valve 22 and a line 23 connects the inlet of the compressor to the valve 22. A hold-back valve 24 may be provided in the line 23 between the valve 22 and inlet of the compressor if desired. If semi-automatic control of the unit is required, the usual high-low switch 25 may be connected to both lines 21 and 23 so as to maintain the pressure of the refrigerant at that preselected or desired.

Connected to one side of the four-way reversing valve is a pipe line 26 which leads to a coil 27 of a water-cooled condenser 28. Water is pumped through the shell of the condenser 28 around the coil by means of a pump 29, the inlet to which is connected by a line 30 to the water outside of the hull 1 and the outlet of which is connected by a line 31 to the shell of the condenser 28. The water is discharged from the shell of the condenser 28 by means of a line 32 which discharges to the outside of the hull.

Leading from the opposite end of the condenser 28 is a pipe line 33 which leads through a suitable one-way check valve 34 to the input side of a receiver 35. A manual valve 36 is installed in the line 33 between the condenser 28 and the valve 34 and may be used to open or close the line to the extent desired. Suitable manual service valves 37 and 38 are provided in the pipe lines on opposite sides of the receiver 35 so as to isolate it for servicing.

Leading from the receiver 35 is a line 39 which leads through a suitable strainer and drier 40 and thence to the main feed line 41 from which the media in the system can be passed from the unit or source to the main feed lines.

Connected to the line 41 is a manifold 42 to which, in turn, are connected the lines leading to the respective radiators or to selected groups of the radiators.

Figure 4:
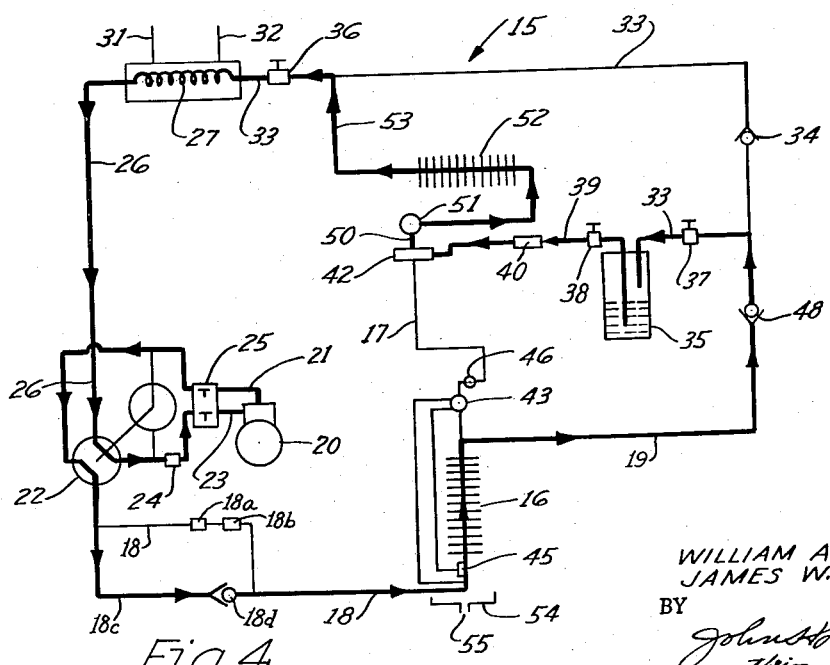
Fig. 4 is an illustration of the heating and cooling system illustrating its operation during a heating cycle.

For purposes of illustration, since each radiator, or each group comprising a number of radiators connected in parallel with each other, employs the same number of lead lines, only one radiator is illustrated in Figs. 3 and 4, it being readily apparent from the illustrative example in what manner the others are connected.

The line 17 is connected to its radiator 16 through a suitable expansion valve 43 which is a conventional unidirectional flow valve, for gaseous refrigeration systems, arranged to discharge the refrigerant toward the radiator 16 and prevent the return of the refrigerant in the opposite direction. The line 18 connects the opposite side or end of the radiator 16 to the valve 22, during the cooling cycle. A suitable pressure regulator 18a and strainer 18b are provided, in series with each other, in the line 18 between the radiator 16 and valve 22.

A by-pass line 18c is connected to the line 18 in by-passing relation to the series-connected regulator 18a and strainer 18b. A check valve 18d is arranged in the by-pass line 18a and opens toward the radiator during the heating cycle and closes and restrains the refrigerant to flow through the regulator 18a and strainer 18b during the cooling cycle.

When the system is used as a cooling cycle therefore, the flow is as follows:

The refrigerating medium in compressed form passes from the outlet of the compressor 20 through the line 21 and reversing valve 22 to the inlet side of the coil 27 of the condenser 28, wherein, while in compressed condition, it is cooled and condensed. Thereupon, the valve 36 being open, the liquid medium passes through the line 33 and check valve 34 to the inlet side of the receiver 35. The medium passes from the receiver 35 through the strainer and drier 40 and thence to the manifold 42 from which it passes to the various radiators. For example, in the one radiator shown, the liquid medium passes through the line 17 to the expansion valve 43 and thereby is expanded into the radiator 16 in one of the rooms, thus cooling the air in the room. The medium then passes in gaseous form into the return line 18 to the valve 22 and thence to the inlet of the compressor 20 through the hold-back valve 24 and return line 23.

It is to be noted that the radiators are provided with thermostatic controls 45 which may be set to control the temperature desired in the room.

If a bank of radiators is to be supplied by a single line 17 and return line 18, such may be provided, and the same or various groups thereof cut off by a suitable solenoid valve, such as 46, so that, if desired, only one or more selected compartments of the boat need be air conditioned or cooled.

In the heating cycle, the system is reversed by reversing the valve 22 in which case, as illustrated in Fig. 4, the radiators 16 in th room become the condensing units. The refrigerant medium, in gaseous form, is pumped under pressure by the compressor 20 to the radiators 16 and by them its heat is radiated and it is condensed. Because of the valve 43, the medium cannot pass back through the line 17. Instead, the line 19 is used as a by-pass line and is connected to the radiator between the expansion valve 43 and the radiator core, so that the liqud refrigerant, having given up its heat in the rooms, can flow back to the inlet of the receiver 35. The line 19 leads to the receiver through a check valve 48 into the line 33 between the valve 37 and the check valve 34 and thus to the inlet side of the receiver 35.

Thus, in the heating cycle, the gaseous refrigerant is compressed by the compressor 20 and passes through the line 18 to the radiator 16, wherein it gives up heat and condenses and then passes in liquid form to the line 19 through check valve 48 and service valve 37 to the inlet side of the receiver 35. From the receiver, it passes through a by-pass line 50 to an unidirectional flow expansion valve 51 which discharges the liquid medium and expands it nto an air-cooled heat exchanger 52 by virtue of which the medium can pick up the heat from the heat exchanger 52 which, during heating, acts as an air evaporator. The expansion valve 51 is a unidirectional flow valve arranged to discharge the refrigerant toward the air cooled condenser 52 and prevent the return of the refrigerant in the opposite direction. The outlet of the air-cooled evaporator 52 is connected by a line 53 to the line 33 between the water-cooled condenser 28 and the check valve 34. The check valves 34 and 48 open toward each other. The expanding liquid refrigerant or medium picks up heat from the engine room and localities adjacent the air-cooled heat exchanger 52, now operating as an evaporator, and passes through the coil 27 of the condenser 28, now acting as an evaporator, thus absorbing more heat from the water pumped into the shell of the condenser 28 by the pump 29. The liquid medium becomes heated sufficiently to provide a rather warm expanded gas which passes to the valve 22 and thence to the inlet side of the compressor 20 whereupon it can again be compressed and circulated readily.

The valve 51, being an expansion valve, prevents the passage of any appreciable liquid refrigerant, during the cooling cycle, from the line 41 through the evaporator 52 back to the line 33, particularly inasmuch as both sides of the evaporator 52 are under about the same pressure.

On the other hand, during the heating cycle, since the liquid refrigerant from the line 19 cannot pass above the check valve 34, (Fig. 4), it is constrained to pass through the valve 51 and expand into the air heat exchanger 52, now acting as an evaporator, and then discharge into the line 33 beyond the check valve 34 and in advance of the manual valve 36.

During the heating cycle, the compressed and liquid refrigerant will not pass from the line 17 through the valves 43 due to the fact that the pressure in the line 19 is substantially equal to the pressure in line 17.

Figure 1:
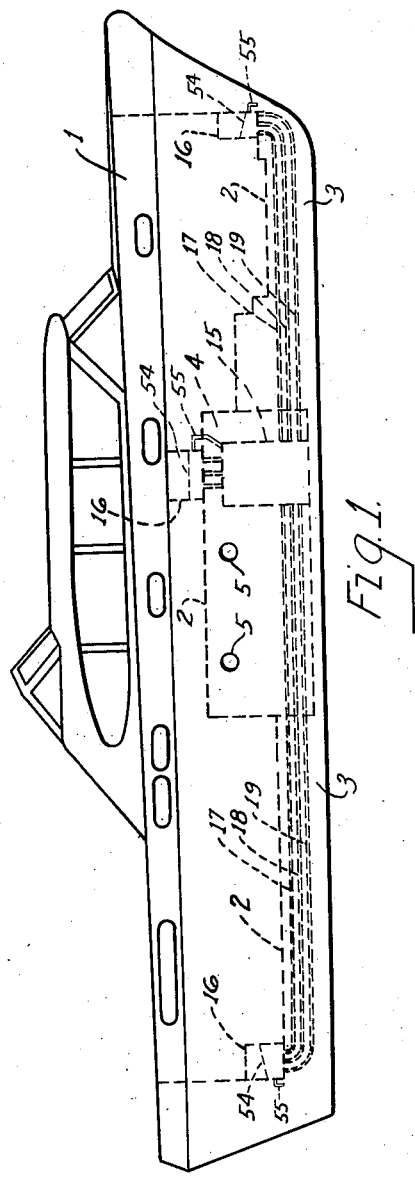

The radiators 16 are relatively small and compact and, in the form illustrated in Figs. 1 and 2, one unit is provided in each of the locations indicated. However, it is apparent that in some of the larger quarters it may be desirable to connect one or more units in parallel and to connect the same to a common set of lines 17, 18, and 19. If so, they work in effect as a single unit. Again, if desired, each unit may have its own set of lines 17, 18, and 19. The lines 17, 18, and 19 are high pressure hydraulic hoses. The other lines, for example, lines 21, 23, 26, 33, 39, and 41, also may be like hydraulic hoses.

Since the compressor 20, air-cooled evaporator 52 and water-cooled condenser 27 are all located in the engine room, a number of advantages are provided. A quantity of heat can be obtained and put into the system through the air-cooled evaporator 52 due to the radiation of heat into the engine room by the engine while the heat exchanger 52 is acting as an evaporator. This helps to reduce the temperature of the engine room and also to provide heat which can be delivered to the other compartments without any communication between the engine room and those compartments and consequent escape of gases and fumes thereinto from the engine room. Furthermore, not only is the heat of compression recuperated, but such heat as is radiated from the compressor can be picked up to a large extent by the evaporator 52. Again, the outside heat from the water in which the boat is operating can be obtained.

Since high pressure hydraulic hoses are used for the lines, installation, service and repair are very simple. The main lead lines 17, 18, and 19 are connected at one end to the unit 15, usually to the manifold 42 thereof. Each set of lines is merely pulled through the bilge and brought up to the point where required to its particular radiator 16. The lines may be lightly anchored in the bilge or not, but preferably they are allowed to lie loosely in the bilge and sway with the surge of the water in the bilge. There are practically no losses in heating or cooling due to the passage of the refrigerating media through the hoses.

Furthermore, the unit for a given boat can be laid out at the factory site and the unit shipped with the hoses ready to install. The installation can be effected in such a short time that installation is not objectionable from the standpoint of men working in the bilge. The hoses need only be drawn through the bilge up through the deck at the point required.

As mentioned, there is provided beneath each of the radiators 16 a suitable drip pan 54 which is provided with a discharge hose 55 which drains directly into the bilge so that any condensate formed during the cooling cycle can readily be pumped out and disposed of with the bilge water.

While we have shown the system in simplifed form, it is apparent that remote controls of various types, such as solenoid operated valves, can readily be added.

Having thus described our invention, we claim:

1. In combination, a power boat having an engine compartment, an engine therein, a plurality of passenger spaces isolated from the engine compartment, radiator units in the spaces, respectively, a reversible heating and cooling refrigerating system employing an expansible and compressible gaseous refrigerant, a compressor having an inlet and an outlet, a water-cooled condenser for the refrigerant, a refrigerant receiver having an inlet and an outlet, expansion valve means for the units, a settable sealed reversible circuit means operative, when set for a cooling cycle, for connecting the condenser between the outlet of the compressor and inlet of the receiver and for connecting the units to the outlet of the receiver through the expansion valve means and to the inlet of the compressor, and operative, when set for the heating cycle, for connecting the condenser between the inlet of the compressor and the outlet of the receiver, and the units between the outlet of the compressor and the inlet of the receiver in by-passing relation to the expansion valve means of the units, a supplemental air-to-fluid heat exchanger in the engine compartment in proximity to the engine for heating thereby, an auxiliary fluid circuit operative for connecting the supplemental heat exchanger to the receiver outlet and in fluid communication with the compressor inlet when the settable sealed circuit means is set for said heating cycle and while the water-cooled condenser is connected to the inlet of the compressor and is in fluid communication with the outlet of the receiver, and means for circulating water in heat exchange relation to the water-cooled condenser.

2. The structure according to claim 1 characterized in that the supplemental heat exchanger and the water-cooled condenser are connected in series with each other between the outlet of the receiver and the inlet of the compressor when the settable sealed circuit means is set for the heating cycle.

3. The structure according to claim 1 characterized in that said units are connected in parallel with each other to the outlet of the receiver in the cooling cycle and are connected in parallel to the inlet of the receiver during the heating cycle.

4. The structure according to claim 3 characterized in that said expansion valve means comprises expansion valves respective to said units.

5. The structure according to claim 1 characterized in that valve means are provided to connect the receiver outlet to the expansion valve means of the units when the settable circuit means is set for the cooling cycle, and additional valve means to connect said units between the inlet of the receiver and outlet of the compressor when the circuit means is set for the heating cycle.

6. A combination according to claim 1 further including a bilge in the boat hull, said settable sealed reversible circuit means including main feed and return lines for the refrigerant, said main lines being of flexible, high pressure, highly thermal insulating, hydraulic hose of a composition which is highly resistant to deterioration by bilge liquids, and said lengths of hose being disposed in the bilge.

7. A combination according to claim 6 characterized in that said hose lengths are loose and free between their ends for ease in removal from the bilge for repair upon disconnection from the units.

References Cited in the file of this patent

UNITED STATES PATENTS

| | | |
|---|---|---|
| 276,824 | Johnson | May 1, 1883 |
| 1,935,281 | Reed | Nov. 14, 1933 |
| 2,276,814 | Zivickl | Mar. 17, 1942 |
| 2,715,317 | Rhodes | Aug. 16, 1955 |
| 2,750,764 | Lynch | June 19, 1956 |
| 2,787,128 | Brown | Apr. 2, 1957 |